(12) United States Patent
Artinger

(10) Patent No.: US 8,025,148 B2
(45) Date of Patent: Sep. 27, 2011

(54) STACKABLE ROLL CONTAINERS

(75) Inventor: Manfred Artinger, Auerbach (DE)

(73) Assignee: Gebhardt Transport-und Lagersysteme GmbH, Cham (DE)

( * ) Notice: Subject to any disclaimer, the term of this patent is extended or adjusted under 35 U.S.C. 154(b) by 7 days.

(21) Appl. No.: 12/171,875

(22) Filed: Jul. 11, 2008

(65) Prior Publication Data

US 2009/0020449 A1    Jan. 22, 2009

(30) Foreign Application Priority Data

Jul. 13, 2007   (DE) .......................... 10 2007 033 147
Jul. 13, 2007   (DE) ...................... 20 2007 009 933 U

(51) Int. Cl.
*B62D 63/00*   (2006.01)

(52) U.S. Cl. ......................... 206/518; 206/515; 206/508

(58) Field of Classification Search .................. 206/515, 206/518, 508; 280/33.996, 33.997, 33.998, 280/47.18, 47.34, 47.35, 655, 656, 789, 79.11, 280/79.2
See application file for complete search history.

(56) References Cited

U.S. PATENT DOCUMENTS

| | | | | |
|---|---|---|---|---|
| 3,582,102 A * | 6/1971 | Bewick | ..................... | 280/33.998 |
| 4,165,088 A * | 8/1979 | Nelson | ..................... | 280/47.35 |
| 5,159,875 A * | 11/1992 | Cohen | ..................... | 100/34 |
| 5,408,187 A * | 4/1995 | Mackie | ..................... | 324/555 |
| 5,480,187 A * | 1/1996 | Binning | ..................... | 280/79.2 |
| 5,785,328 A * | 7/1998 | Eckloff | ..................... | 280/33.998 |
| 6,431,580 B1 * | 8/2002 | Kady | ..................... | 280/655 |
| 6,543,795 B1 * | 4/2003 | Merced Ferrer | ..................... | 280/33.998 |
| 6,808,184 B2 * | 10/2004 | Ames | ..................... | 280/33.997 |
| 6,848,695 B2 * | 2/2005 | Panasewicz et al. | ..................... | 280/33.998 |
| 6,983,946 B2 * | 1/2006 | Sullivan et al. | ..................... | 280/79.11 |
| 7,175,205 B2 * | 2/2007 | Simpson | ..................... | 280/789 |
| 7,431,312 B2 * | 10/2008 | Sebastian et al. | ..................... | 280/33.998 |
| 2006/0103094 A1 * | 5/2006 | Wiff et al. | ..................... | 280/79.11 |

FOREIGN PATENT DOCUMENTS

| | | |
|---|---|---|
| EP | 0 719 691 A1 | 7/1996 |
| EP | 1 118 524 A2 | 7/2001 |
| EP | 1 777 137 A1 | 4/2007 |
| WO | WO 2007/001166 A1 | 1/2007 |

OTHER PUBLICATIONS

European Search Report for EP 2 014 535 A3 dated Jan. 26, 2010 (3 pages).

* cited by examiner

*Primary Examiner* — Anthony Stashick
*Assistant Examiner* — Cynthia Collado
(74) *Attorney, Agent, or Firm* — The Culbertson Group, P.C.

(57) ABSTRACT

A stackable roll container, in particular, for transporting foods, cosmetic articles, or other articles in large bundles. The stackable roll container includes a preferably rectangular bottom component, with transport rollers mounted on the underside. The stackable roll container also includes two attachment walls located opposite each other on opposite lateral sides of the bottom component. Each attachment wall extends upwardly from an upper side of the bottom component and has a respective rear vertical end brace which is offset from a vertical base plane of the respective attachment wall. Each attachment wall also includes a lower horizontal base brace adjoining the respective rear vertical end brace for that attachment wall.

18 Claims, 3 Drawing Sheets

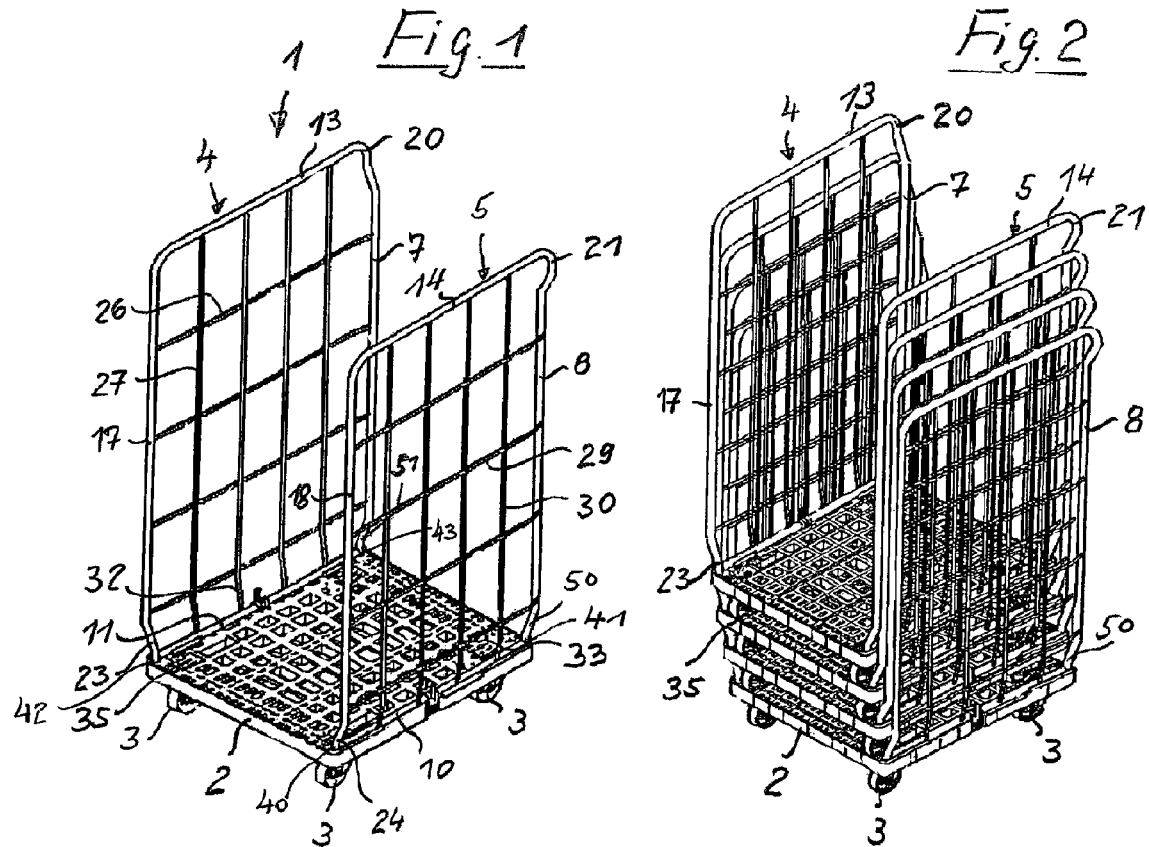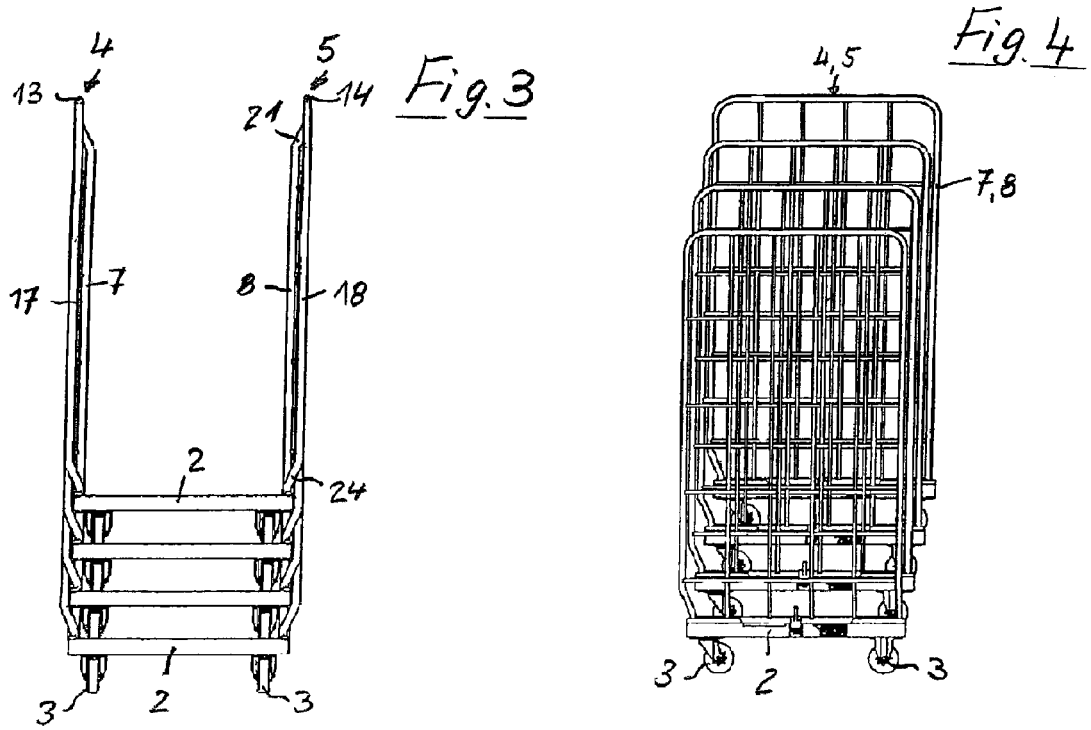

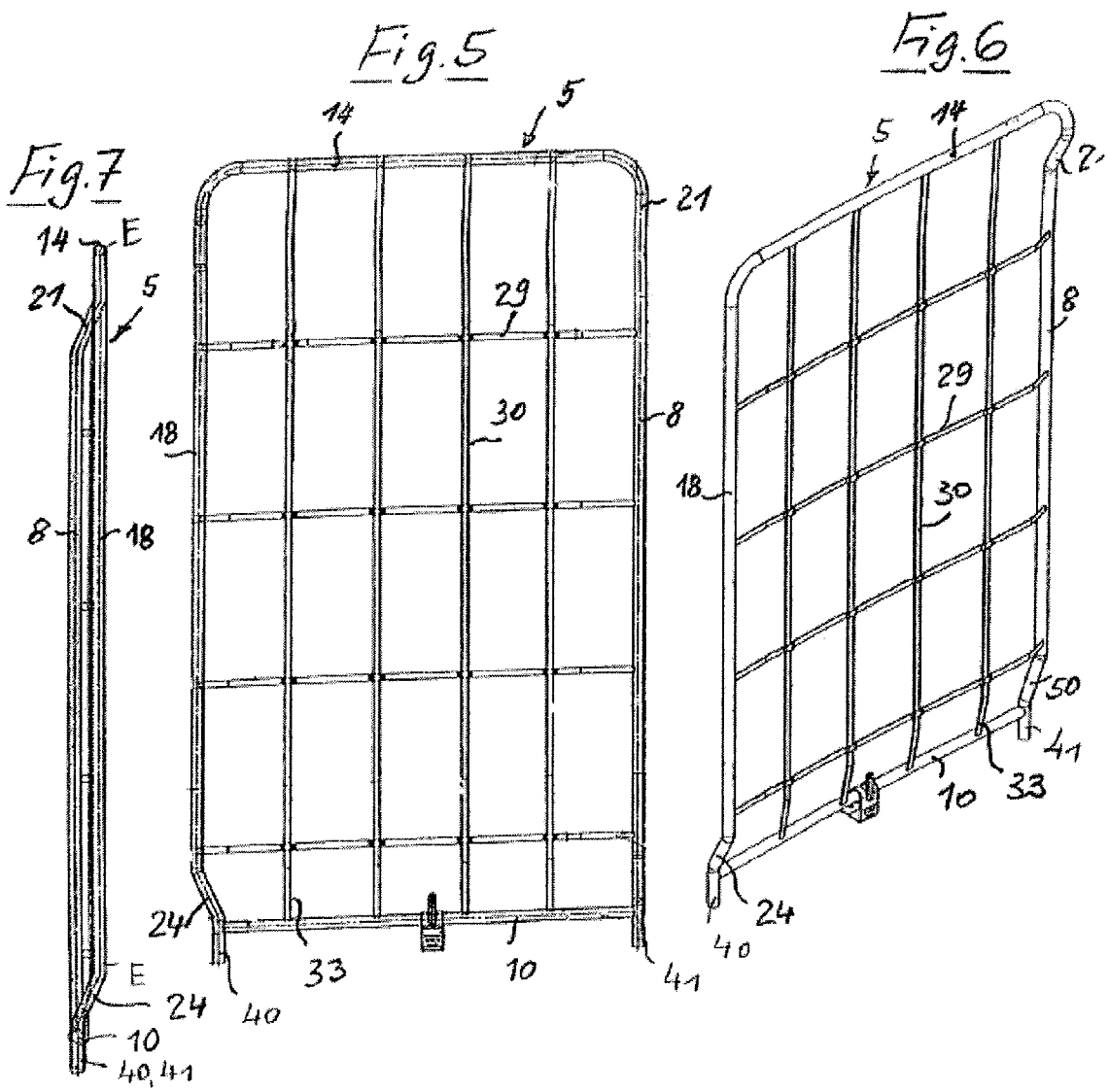

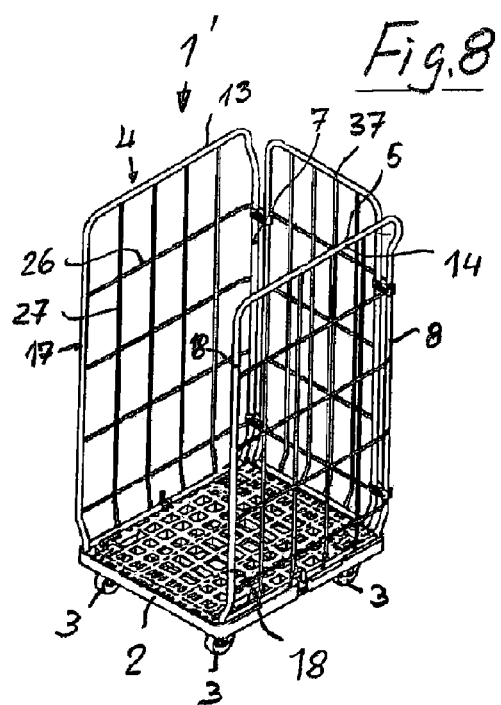 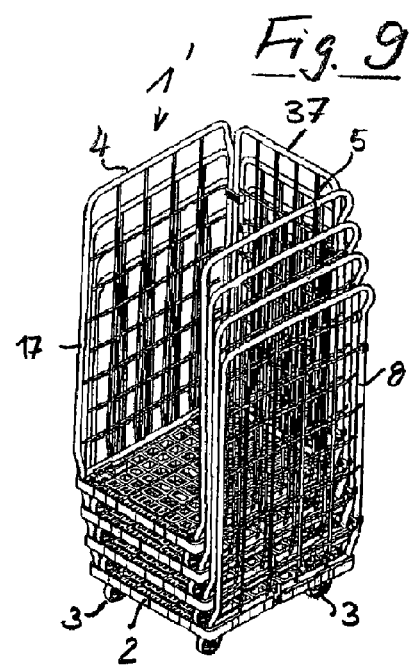 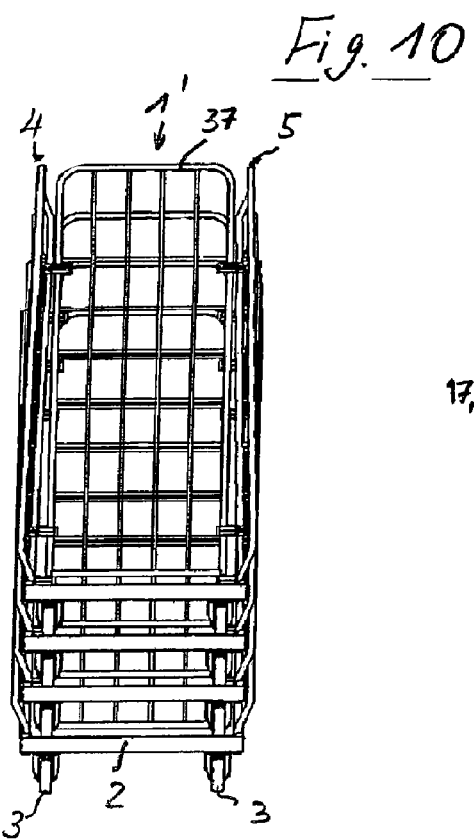 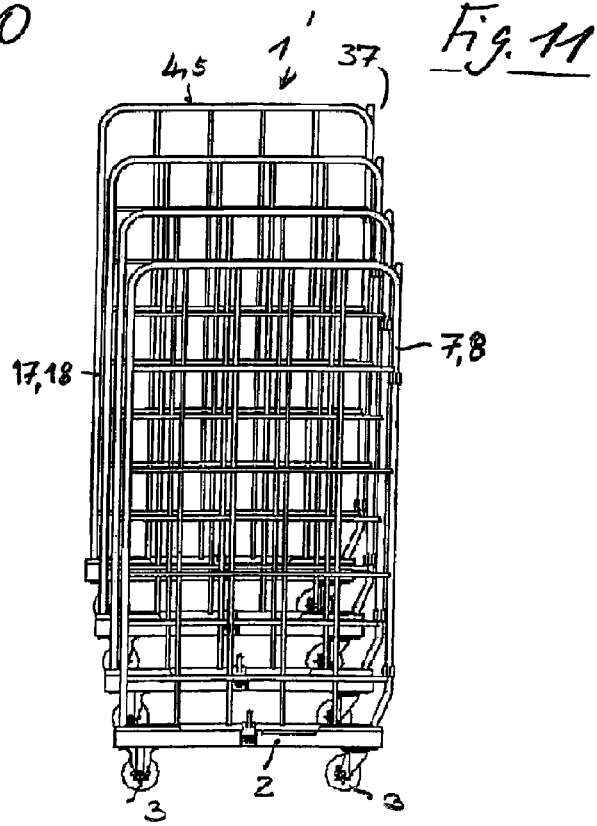

STACKABLE ROLL CONTAINERS

TECHNICAL FIELD OF THE INVENTION

The invention refers to a stackable roll container, in particular for the transporting of foods, cosmetic articles, or items of practical use in large bundles. The stackable roll container preferably has a rectangular bottom, on which transporting rollers on the underside and two attachable walls that are opposite one another are located.

Also, three-side solutions are the subject of the invention, wherein a third wall can be provided as a back wall. Also, containers closed on all sides are encompassed within the scope of the present invention.

BACKGROUND OF THE INVENTION

For the transport of foods, cosmetic articles, or other items of practical use, so-called roll containers are predominantly used by distribution channels. A distinction is hereby made between so-called roll containers that cannot "nest" in one another—that is, roll containers that cannot be stuck into one another—and stackable roll containers. Roll containers that cannot nest in one another require considerable storage room costs and are impractical in handling. Also the dismantling expense (for example, for return transport) is considerable, and the damage rate to rollers and frames is particularly large, in particular with containers transported overhead.

Roll containers that can nest in one another have a specially designed bottom frame, for example, in a trapezoid form of the bottom construction or the form of a "Z" or a "V," wherein these known constructions make possible a straight-line or lateral nesting.

The different embodiments of the roll containers that can nest in one another are, in part, weight-heavy constructions, have a loud noise emission, and are not suited or have only a limited suitability for modern conveying technology.

SUMMARY OF THE INVENTION

The goal of the present invention is, in contrast to above-described prior art, to create a stackable roll container of the type mentioned in the Technical Field of the Invention section above, which, with a simple structure does not require dismantling, makes possible a space-saving storage of unneeded roll containers in the branch or in the distribution warehouse and in the truck, and does not require any high tools costs for re-equipping.

In accordance with the invention, this goal is attained in that each of the attachment walls opposite one another has a retracted, rear, vertical end brace opposite a vertical base plane, and an adjoining lower, horizontal base brace.

By means of this special construction design, a roll container that can nest into another is created, and is able to fulfill all the requirements that may appear in actual practice and, at the same time, can be produced in a simple manner.

In another development of the invention, each attachment wall has an upper, horizontal base brace in the base plane, and adjoining this a front, vertical end brace. The retracted, rear, vertical end brace and the horizontal, upper base brace, on the one hand, and the lower, horizontal base brace and the front, vertical end brace, on the other hand, are connected to one another via retracted areas. By means of these retracted areas, it is possible to stick the roll containers into one another in a simple manner.

With containers with vertical and horizontal lattice bars of the attachment walls, the horizontal lattice rods of the opposite attachment walls in the retracted area opposite the base plane, can be connected to the front and rear end braces. The vertical lattice bars can be in the area of the base plane and can be connected to the individual, upper, horizontal base brace and, by means of inclined connections, to the individual, lower, horizontal base brace.

In another configuration of the invention, each bottom can have at least one recess for locking, in the area of the transport roller lying above it, of the roll container stacked above it, whereby a secure stacking capacity of the roll containers arranged one above the other is attained. Moreover, the possibility exists that in another configuration of the invention, each bottom, on the upper side, has at least one groove for guiding at least one of the transport rollers. One has to preferably take care that the guiding of the roller is as free of jerking as possible, so that a container can be inserted or thrust effortlessly and easily into the bottom frame (or the running groove) of a container found beneath it.

In another configuration of the invention, a closure insertion wall transverse to the two attachment walls opposite one another can be located between them, wherein the closure insertion wall and the two attachment walls can be affixed to one another and to the bottom. All side walls can be affixed to the bottom by means of plug connections in recesses, which are known. In accordance with the invention, the side walls, when inserted, can deflect laterally within the desired tolerances, so as to facilitate the nesting. In a manner different from rigid containers from the state of the art, this mobility permits the slight pressing apart of the side walls, in order to be able to push the containers more easily into one another.

If a three-side solution with a rear wall is provided, then this rear wall can preferably be connected to the side walls via suitable hinges. The hinges thereby likewise permit the aforementioned movement of the side walls within the desired tolerance for an easier nesting. The hinges preferably permit a clearance of 30 mm-40 mm, perhaps by means of a longitudinal hole construction or with other hinge displacement elements.

Finally, the container, in accordance with the invention, can also be provided with a (preferably suspendable or metal) door, in order to close it from the front. Alternatively, another suitable front cover (tarpaulin, etc.) can be used to close the container.

Preferably, intermediate bottoms are provided, which can be laid or suspended between the side walls and are used for load distribution or stabilization of the container. If a rear wall is provided as a third side wall, the intermediate bottoms can also contribute to the stabilizing connection of the walls among one another, if they interact mechanically with each wall in a suitable manner (suspended on three sides; suspended on two sides with a stop on the third wall, etc.).

These and other advantages and features of the invention will be apparent from the following description of the preferred embodiments, considered along with the accompanying drawings.

BRIEF DESCRIPTION OF THE DRAWINGS

FIG. 1 is a perspective view of an individual, stackable roll container embodying the principles of the invention.

FIG. 2 is a view in perspective similar to FIG. 1 but showing four stackable roll containers in the form shown in FIG. 1 stacked together according to the present invention.

FIG. 3 is a front end view of the four stackable roll containers shown in FIG. 2.

FIG. 4 is a left side view of the four stackable roll containers shown in FIG. 2.

FIG. 5 is a side view of the right attachment wall of the roll container shown in FIG. 1.

FIG. 6 is a perspective view of the right attachment wall shown in FIG. 5.

FIG. 7 is an end view of the right attachment wall shown in FIGS. 5 and 6.

FIG. 8 is a perspective view of a stackable roll container with three attachment walls.

FIG. 9 is a perspective view of four stackable roll containers, each in the form shown in FIG. 8, stacked together according to the present invention.

FIG. 10 is a front end view of the four stackable roll containers shown in FIG. 9.

FIG. 11 is a right side view of the four stackable roll containers shown in FIG. 9.

DESCRIPTION OF ILLUSTRATIVE EMBODIMENTS

As shown in FIGS. 1 and 5-7, the invention concerns a stackable roll container 1, which can be used, in particular, for the transporting of foods, cosmetic articles or other items of practical use in large bundles. This roll container 1 preferably has a rectangular bottom or bottom component 2, on which in accordance with FIG. 1 transport rollers 3 on the underside and two attachment walls 4, 5, opposite one another are located. These attachment walls 4, 5 extend along opposing lateral sides of bottom 2 and can be inserted into corresponding recesses of the bottom 2 by means of pins 40, 41, and 42, 43, in accordance with FIGS. 1 and 5.

In accordance with the invention, each of the attachment walls 4, 5 opposite one another has a retracted, rear, vertical end brace 7 or 8 opposite a vertical base plane E-E in accordance with FIG. 7, and a lower, horizontal base brace 10, 11, which adjoins said brace via an incline 50 or 51. That is, the rear vertical end brace 7 and 8 of the respective attachment wall 4 and 5 is offset from the base plane E-E of the respective attachment wall inwardly in the direction of the opposing attachment wall at the opposite lateral side of bottom 2.

Moreover, each attachment wall 4, 5 has an upper, horizontal base brace 13, 14 in the base plane E-E in accordance with FIGS. 1 and 6, and adjoining it, a front, vertical end brace 17, 18.

From FIG. 1, one can see that the retracted, rear, vertical end brace 7, 8 and the horizontal, upper base brace 13, 14 of each attachment wall are connected to one another via a retracted area or upper offset connection member 20, 21. Likewise, the horizontal, lower base braces 10, 11 and the front, vertical end braces 17, 18 are connected to one another via retracted areas or lower offset connection members 23 and 24, in accordance with FIG. 1 or in accordance with FIGS. 5 and 6.

The attachable side walls 4, 5 can be provided with horizontal lattice braces 26 and 29 and with vertical lattice braces 27 and 30. In accordance with the invention, the horizontal lattice braces 26 and 29 of the opposite attachment walls 4, 5 are connected to the front and rear end braces 7, 17 or 8, 18 in the retracted area opposite the base plane E-E. The vertical lattice rods 27 and 30 are hereby in the area of the base plane E-E and are connected to the individual upper, horizontal base brace 13, 14 and to the individual lower, horizontal base brace 10, 11 via inclined connections 32 and 33 (see FIG. 6).

In order to hold the roll containers in accordance with the invention in their shoved-in position, depicted stacked in FIGS. 2, 3, and 4, there is the possibility in accordance with the invention that each bottom 2 has at least one recess 35 in accordance with FIG. 1 for the locking, in the area of the transport roller 3 lying above, of the roll container stacked above it. Moreover, each bottom 2 has on the upper side at least one groove, which is not depicted in more detail, for guiding at least one of the transport rollers 3 of the roll container 1 stacked above it.

Bottom 2 preferably is made of plastic and has recesses so that the attachable side walls 4 and 5 can be affixed on the bottom via plug connections, which are not depicted in more detail.

With the embodiment in accordance with FIGS. 2-4, the stackable roll container has two attachable walls 4, 5 opposite one another, which have a special constructive design for nesting feasibility.

According to the invention as per FIGS. 8-11, there is also a possibility for the roll container 1' to have a closure insertion wall 37 between the two attachable walls 4 and 5 opposite one another, which is connected both to the individual attachable walls 4 and 5 as well as to bottom 2 via connections that are known.

With this construction in accordance with the invention, the attachable walls 4 and 5 also have the configuration according to the invention, as they are depicted in particular in FIGS. 1 and 5-7 in detail, for a right attachable wall. The closure insertion wall 37 is not affected by it, so that there is the possibility according to FIGS. 9-11, of also transporting this construction form of the attachable roll container in a stackable form in a space-saving manner.

As used herein, whether in the above description or the following claims, the terms "comprising," "including," "carrying," "having," "containing," "involving," and the like are to be understood to be open-ended, that is, to mean including but not limited to.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A stackable roll container including:
    (a) a bottom component having a front and a rear and an imaginary center line running along the center of the bottom component from the front to the rear;
    (b) a number of transport rollers mounted on an underside of the bottom component;
    (c) a first side attachment wall attached to the bottom component at a first lateral side of the bottom component and extending upwardly from an upper side of the bottom component, the first side attachment wall having (i) a front vertical end brace positioned relatively outwardly, with respect to the center line, from a rear vertical end brace which is offset from a vertical base plane of the first side attachment wall in a direction toward a second lateral side of the bottom component opposite the first lateral side, and having (ii) a lower horizontal brace adjoining the rear vertical end brace of the first side attachment wall;

(d) a second side attachment wall attached to the bottom component at the second lateral side of the bottom component and extending upwardly from the upper side of the bottom component, the second side attachment wall having (i) a front vertical end brace positioned relatively outwardly, with respect to the center line, from a rear vertical end brace which is offset from a vertical base plane of the second side attachment wall in a direction toward the first lateral side of the bottom component, and having (ii) a lower horizontal brace adjoining the rear vertical end brace of the second side attachment wall; and (e) the first side attachment wall has an upper horizontal base brace defining an upper extent of the first side attachment wall, and also has a front vertical end brace adjoining the upper horizontal brace of the first side attachment wall in the base plane of the first side attachment wall.

2. The stackable roll container of claim 1 wherein:
the second side attachment wall has an upper horizontal base brace defining an upper extent of the second side attachment wall, and also has a front vertical end brace adjoining the upper horizontal brace of the second side attachment wall in the base plane of the second side attachment wall.

3. The stackable roll container of claim 2 wherein:
(a) in the first side attachment wall (i) the rear vertical end brace and the upper horizontal base brace are connected via an upper offset connection member, and (ii) the lower horizontal base brace and the front vertical end brace are connected via a lower offset connection member; and
(b) in the second side attachment wall (i) the rear vertical end brace and the upper horizontal base brace are connected via an upper offset connection member, and (ii) the lower horizontal base brace and the front vertical end brace are connected via a lower offset connection member.

4. The stackable roll container of claim 2 wherein:
(a) the first side attachment wall includes a number of vertical lattice rods and a number of horizontal lattice rods, the horizontal lattice rods of the first side attachment wall connected between the front end brace and rear end brace; and
(b) the second side attachment wall includes a number of vertical lattice rods and a number of horizontal lattice rods, the horizontal lattice rods of the second side attachment wall connected between the front end brace and rear end brace.

5. The stackable roll container of claim 4 wherein:
(a) in the first side attachment wall, the vertical lattice rods lie in the base plane of the first side attachment wall, are each connected at their respective upper end to the upper horizontal base brace of the first side attachment wall, and are each connected at their respective lower end to the lower horizontal base brace of the first side attachment wall via inclined connections, inclined at least partially outside of the base plane of the first side attachment wall; and
(b) in the second side attachment wall, the vertical lattice rods lie in the base plane of the second side attachment wall, are each connected at their respective upper end to the upper horizontal base brace of the second side attachment wall, and are each connected at their respective lower end to the lower horizontal base brace of the second side attachment wall via inclined connections, inclined at least partially outside of the base plane of the second side attachment wall.

6. The stackable roll container of claim 1 further including, for each transport roller of a second stackable roll container to be received on the stackable roll container, a respective recess in the upper side of the bottom component for receiving a portion of a respective transport roller of the second stackable roll container.

7. The stackable roll container of claim 6 further including at least one groove included with each recess for guiding one of the transport rollers of the second stackable roll container.

8. The stackable roll container of claim 1 wherein the bottom component is made of plastic.

9. The stackable roll container of claim 1 further including a closure insertion wall extending transversely between the first side attachment wall and the second side attachment wall at one end of the bottom component.

10. The stackable roll container of claim 9 wherein the closure insertion wall is affixed to the first side attachment wall, to the second side attachment wall, and to the bottom component.

11. The stackable roll container of claim 1 wherein the first side attachment wall and the second side attachment wall are each affixed to the bottom component via respective plug and recess connections.

12. The stackable roll container of claim 1 wherein the first side attachment wall and the second side attachment wall are each affixed to the bottom component so as to be deflectable laterally with respect to their respective base plane within desired tolerances so as to facilitate the nesting of a second stackable roll container there between.

13. The stackable roll container of claim 1 further including a rear wall that extends between the first side attachment wall and the second side attachment wall and is connected to each of the side attachment walls by hinges which allow a lateral deflection of each of the side attachment walls in a direction to or from one another within prespecified tolerances.

14. A stackable roll container including:
(a) a bottom component having a front and a rear and an imaginary center line running along the center of the bottom component from the front to the rear;
(b) a number of transport rollers mounted on an underside of the bottom component;
(c) a first side attachment wall attached to the bottom component at a first lateral side of the bottom component and extending upwardly from an upper side of the bottom component, the first side attachment wall having (i) a front end vertical brace and a rear vertical end brace having (ii) a lower horizontal brace adjoining the rear vertical end brace of the first side attachment wall, the first side attachment wall being adapted to allow stacking of the stackable roll container when the first side attachment wall is in a vertical installed position by having at least one of the front or rear vertical end braces positioned relatively outwardly to the other, with respect to the center line; and
(d) a second side attachment wall attached to the bottom component at the second lateral side of the bottom component and extending upwardly from the upper side of the bottom component, the second side attachment wall having (i) a front end vertical brace and a rear vertical end brace, and having (ii) a lower horizontal brace adjoining the rear vertical end brace of the second side attachment wall, the second side attachment wall being adapted to allow stacking of the stackable roll container when the second side attachment wall is in a vertical installed position.

15. The stackable roll container of claim 14 wherein the adaptation allowing stacking of the stackable roll container includes the first side attachment wall having a front vertical end brace positioned relatively outwardly, with respect to the center line, from the rear vertical end brace and the second side attachment wall having a front vertical end brace positioned relatively outwardly, with respect to the center line, from the rear vertical end brace.

16. The stackable roll container of claim 14 wherein:
(a) the first side attachment wall has an upper horizontal base brace defining an upper extent of the first side attachment wall, and also has a front vertical end brace adjoining the upper horizontal brace of the first side attachment wall in the base plane of the first side attachment wall; and
(b) the second side attachment wall has an upper horizontal base brace defining an upper extent of the second side attachment wall, and also has a front vertical end brace adjoining the upper horizontal brace of the second side attachment wall in the base plane of the second side attachment wall.

17. The stackable roll container of claim 16 wherein:
(a) in the first side attachment wall (i) the rear vertical end brace and the upper horizontal base brace are connected via an upper offset connection member, and (ii) the lower horizontal base brace and the front vertical end brace are connected via a lower offset connection member; and
(b) in the second side attachment wall (i) the rear vertical end brace and the upper horizontal base brace are connected via an upper offset connection member, and (ii) the lower horizontal base brace and the front vertical end brace are connected via a lower offset connection member.

18. The stackable roll container of claim 17 wherein:
(a) in the first side attachment wall, the vertical lattice rods lie in the base plane of the first side attachment wall, are each connected at their respective upper end to the upper horizontal base brace of the first side attachment wall, and are each connected at their respective lower end to the lower horizontal base brace of the first side attachment wall via inclined connections, inclined at least partially outside of the base plane of the first side attachment wall; and
(b) in the second side attachment wall, the vertical lattice rods lie in the base plane of the second side attachment wall, are each connected at their respective upper end to the upper horizontal base brace of the second side attachment wall, and are each connected at their respective lower end to the lower horizontal base brace of the second side attachment wall via inclined connections, inclined at least partially outside of the base plane of the second side attachment wall.

* * * * *